United States Patent

Spear et al.

[11] Patent Number: 5,367,862
[45] Date of Patent: Nov. 29, 1994

[54] ATTACHMENT FOR EASING THE MANIPULATION OF A HERBAGE TRIMMER

[76] Inventors: Frank M. Spear, 625 Todd Ave.; Mark J. Latess, 621 Todd Ave., both of Ellwood City, Pa. 16117

[21] Appl. No.: 66,250

[22] Filed: May 25, 1993

Related U.S. Application Data

[63] Continuation-in-part of Ser. No. 784,038, Oct. 28, 1991, Pat. No. D. 338,141.

[51] Int. Cl.⁵ ............................................. A01D 34/00
[52] U.S. Cl. ..................................... 56/12.7; 56/17.1; 30/296.1; 30/347
[58] Field of Search ...................... 56/12.6, 12.7, 17.1, 56/154; 30/276

[56] References Cited

U.S. PATENT DOCUMENTS

| | | | |
|---|---|---|---|
| 4,167,812 | 9/1979 | Moore | 56/12.7 |
| 4,914,899 | 4/1990 | Carmine | 56/16.7 |
| 4,936,886 | 6/1990 | Quillen | 56/16.7 |
| 4,981,012 | 1/1991 | Claborn | 56/16.9 |
| 5,065,566 | 11/1991 | Crates | 56/12.7 |
| 5,095,687 | 3/1992 | Andrew | 56/12.7 |

Primary Examiner—Ramon S. Britts
Assistant Examiner—Pamela Anne O'Connor
Attorney, Agent, or Firm—Norman B. Rainer

[57] ABSTRACT

A device intended for installation onto a rotary cord herbage trimmer to permit the trimmer to easily slide omnidirectionally upon the ground being serviced is comprised of a circular saucer-like disc having a downwardly convex bottom surface and an upwardly concave top surface. A straight mounting post is upwardly emergent from the center of the concave surface, and terminates in a threaded distal extremity.

2 Claims, 1 Drawing Sheet

ATTACHMENT FOR EASING THE MANIPULATION OF A HERBAGE TRIMMER

RELATED APPLICATIONS

This application is a continuation-in-part of U.S. patent application Ser. No. 07/784,038, filed Oct. 28, 1991, now U.S. Pat. No. 3,338,141.

BACKGROUND OF THE INVENTION

1. Field of the Invention

This invention relates to rotary edgers, trimmers or the like which employ a flexible cord for cutting grass, weeds and other vegetables in a flail-like manner. Typically these cutters are used in areas in which vegetation is somewhat inaccessible to apparatus employing rigid cutting blades or where there is a risk that rigid blades may throw items concealed by the vegetation.

2. Description of the Prior Art

Generally, such trimmer devices include a head member suspended from an upwardly disposed elongated handle. The head member has a housing that contains an electric motor or gasoline engine which rotates a downwardly directed shaft at high speed. A cutting cord is associated with the shaft, and extends perpendicularly therefrom by centrifugal force to define a cutting plane. The cord is fabricated of a material such as nylon monofilament which is flexible to the extent that it is substantially incapable of causing damage or injury when impacted against persons, animals, trees, etc.

Most embodiments of such trimmer devices include means for detachably holding a supply of cord so that the rotated extremity of the cord may be replaced after wear or breakage resulting from impact during use. The supply of additional cord is generally a continuous coil length stored upon a flanged spool of standardized construction and generally mounted upon said shaft. Fresh cord may be tangentially drawn from the spool to restore the working length, namely the length between the spool and the free extremity of the cord.

In the course of prolonged use of a rotary trimmer device, the significant weight of the apparatus will cause the operator to become arm-weary. To overcome this problem, the placement of wheels below or adjacent the head member has been proposed in U.S. Pat. No. 4,914,899; 4,936,886; 4,981,012 and 5,095,687.

Although wheels permit the apparatus to be rolled upon the ground, the wheels add further weight and also inhibit movement in the transverse direction, namely the direction orthogonal to the plane of rotation of the wheels. Such transverse movement is essential because, in much of the motion of the apparatus, it is swung in an arc-like path centered about the user. Because wheels could be impacted by the rotary string, they must be spaced far from the center of rotation. This in turn requires that the housing be of longer size, with attendant increased weight.

The control of cutting height, namely the elevation of the apparatus above the ground, is important in producing a uniform trimming job. Most trimmer devices have no provision for accurate control of cutting height, such factor being dependent upon the expertise of the operator.

It is therefore an object of the present invention to provide an attachment device for a rotary trimmer whereby said trimmer can be operated with less effort.

It is another object of this invention to provide a device as in the foregoing object which provides height control during use of the trimmer.

It is a further object of the present invention to provide a device of the aforesaid nature which does not impede transverse movement of the trimmer in an arcuate path centered upon the user.

It is a still further object of this invention to provide a device of the aforesaid nature which adds little weight to the trimmer and requires substantially no modification of the trimmer.

It is yet another object of the present invention to provide a device of the aforesaid nature which is easily installable, durable, and amenable to lost cost manufacture.

These and other beneficial objects and advantages will be apparent from the following description.

SUMMARY OF THE INVENTION

The improvements, objects and advantages of the present invention are accomplished by a device comprising a disc of saucer-like configuration having a downwardly convex bottom surface, upwardly concave top surface and upwardly directed circular lip, and a straight mounting post upwardly emergent from the center of said concave surface and terminating in a threaded distal extremity.

The mounting post is adapted to pass through the center of said cord-holding spool, and said distal extremity is threadably secured above said spool in a manner to cause said disc to remain stationary while the cord rotates. The radius of the disc is critically selected so as to be between 40% and 70% of the radius of the string. The thickness of the disc, measured orthogonally between said lip and the lowest portion of said bottom surface, is preferably in the range of $\frac{1}{2}"$ to $1\frac{1}{2}"$.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
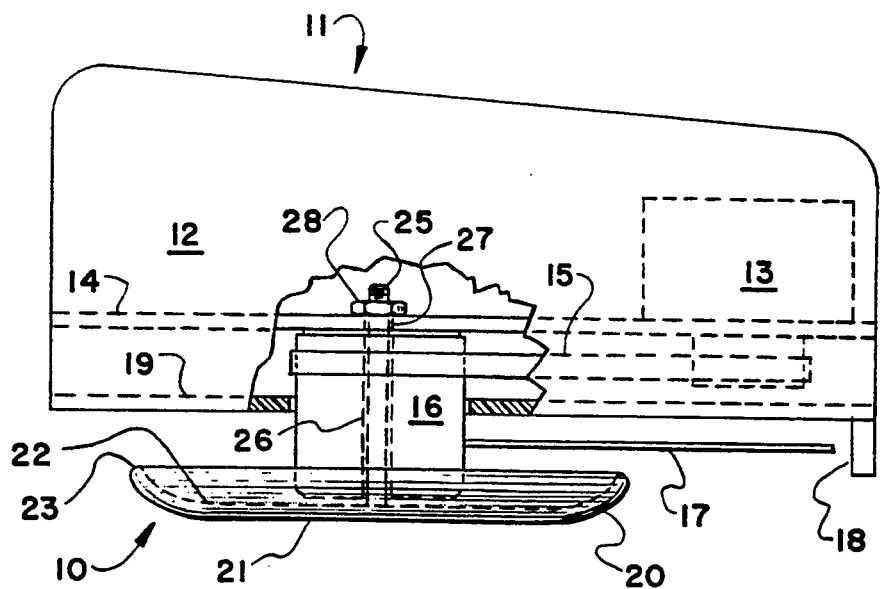
FIG.1 is a side view of an embodiment of the attachment device of this invention shown in functional relationship with a rotary trimmer.
Figure 2:
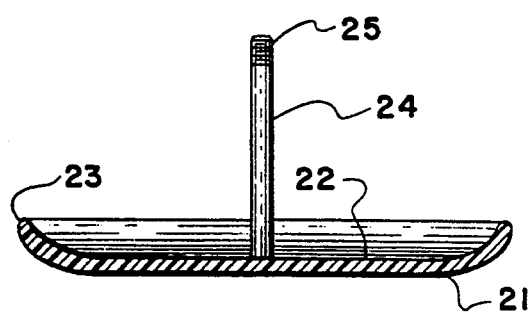
FIG. 2 is a vertical sectional view of the embodiment the device of FIG. 1.
Figure 3:
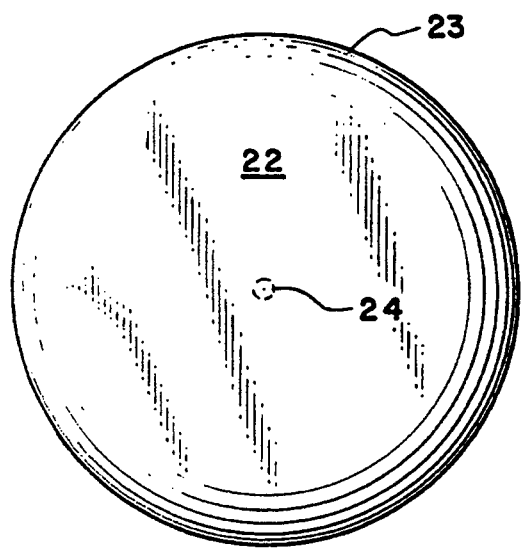
FIG. 3 is a top view of the device.

Referring to FIGS. 1-3, an embodiment of the device 10 of this invention is shown secured to the underside of head member 11 of a rotary trimmer apparatus. Said head member is comprised of housing 12 that encloses electric motor 13 attached to upper support panel 14. A drive belt 15 extends from said motor to engagement with spool 16 rotatively positioned within lower support panel 19. A nylon monofilament cutting line 17 is spirally wound onto spool 16. The free extremity of said line emerges tangentially from said winding. When the spool is rapidly rotated, said free extremity will cut through grass and other vegetation. A trimming blade 18, downwardly dependent from said housing, is interposed within the rotative path of line 17 in a manner to limit the length of said line.

Device 10 is comprised of disc 20 of saucer-like configuration having a downwardly directed bottom surface 21, upwardly concave top surface 22, and upwardly directed circular lip 23. A straight rigid mounting post 24 is upwardly emergent from the center of said concave surface, and terminates in a threaded, distal extremity 25. Although bottom surface 21 of the exemplified embodiment has a flat central portion, said surface may be curved so as to be downwardly convex. The disc has a uniform thickness in the range of 1/16 to 4/16 inch.

Mounting post 24 is adapted to extend through centered bore 26 in spool 16 and further extends through a receiving hole 27 in upper support panel 14. A securing nut 28 threadably secures the distal extremity of post 24 in a manner whereby the device is maintained in stationary position while the spool rotates. The post may be a continuous integral extension of the disc, as may be achieved in a molding operation employing engineering grades of thermoplastic polymers. The post preferably has a size chosen so that top surface 22 of the disc lies in abutment with the bottom surface 30 of spool 16.

By virtue of the critical configuration, size and manner of mounting of the device of this invention, the user of a rotary trimmer can allow the lower surface of the disc to ride upon the grass or other ground structure being serviced. Such action relieves the user from the need to support the entire weight of the rotary trimmer, and further achieves a uniform height of cut.

The device of this invention can be easily installed onto or removed from most generally available models of rotary trimmers.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A device for removable attachment to a herbage trimmer having a head member held by an upwardly disposed elongated handle and a cutting cord extending from a rotatable spool disposed within said head member, said device comprising a disc having a downwardly directed bottom surface having a flat central portion, a top surface and upwardly directed circular lip, and a straight mounting post upwardly emergent from the center of said top surface and terminating in a threaded distal extremity configured to engage said head member to maintain said disc stationary while the cutting cord rotates, said disc having a radius between 40% and 70% of the radius of said cutting cord and a thickness, measured between said lip and bottom surface of between ½" and 1½" said disc configured to rest continuously upon the ground surface so as to support said trimmer.

2. The device of claim 1 wherein said post has a size such as to penetrate said spool and dispose said concave surface closely adjacent said spool.

* * * * *